(12) United States Patent
Joshi (10) Patent No.: US 8,447,934 B2
(45) Date of Patent: May 21, 2013

(54) REDUCING CACHE PROBE TRAFFIC RESULTING FROM FALSE DATA SHARING

(75) Inventor: Shrinivas B. Joshi, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 395 days.

(21) Appl. No.: 12/827,719

(22) Filed: Jun. 30, 2010

(65) Prior Publication Data

US 2012/0005432 A1 Jan. 5, 2012

(51) Int. Cl.
*G06F 12/00* (2006.01)
*G06F 12/08* (2006.01)

(52) U.S. Cl.
USPC ............ 711/146; 711/E12.001; 711/E12.026; 711/E12.04

(58) Field of Classification Search
None
See application file for complete search history.

(56) References Cited

U.S. PATENT DOCUMENTS

| | | | | |
|---|---|---|---|---|
| 6,636,950 B1 * | 10/2003 | Mithal et al. | ................. | 711/147 |
| 6,920,532 B2 * | 7/2005 | Glasco et al. | ................. | 711/141 |
| 6,925,536 B2 * | 8/2005 | Glasco et al. | ................. | 711/141 |
| 6,934,814 B2 * | 8/2005 | Glasco et al. | ................. | 711/141 |
| 7,003,633 B2 * | 2/2006 | Glasco | ......................... | 711/146 |
| 7,024,521 B2 * | 4/2006 | Glasco | ......................... | 711/145 |
| 7,103,726 B2 * | 9/2006 | Glasco | ......................... | 711/141 |
| 7,249,224 B2 * | 7/2007 | Glasco | ......................... | 711/141 |
| 7,272,688 B1 * | 9/2007 | Glasco | ......................... | 711/141 |
| 7,296,121 B2 * | 11/2007 | Morton et al. | ................. | 711/148 |
| 7,334,089 B2 * | 2/2008 | Glasco | ......................... | 711/143 |
| 7,337,279 B2 * | 2/2008 | Glasco | ......................... | 711/141 |
| 7,346,744 B1 * | 3/2008 | Glasco | ......................... | 711/141 |
| 7,373,462 B2 * | 5/2008 | Blumrich et al. | ............. | 711/146 |
| 7,380,071 B2 * | 5/2008 | Blumrich et al. | ............. | 711/146 |
| 7,386,683 B2 * | 6/2008 | Blumrich et al. | ............. | 711/146 |
| 7,386,684 B2 * | 6/2008 | Blumrich et al. | ............. | 711/146 |
| 7,386,685 B2 * | 6/2008 | Blumrich et al. | ............. | 711/146 |
| 7,392,351 B2 * | 6/2008 | Blumrich et al. | ............. | 711/146 |
| 7,392,352 B2 * | 6/2008 | Mithal et al. | ................. | 711/147 |
| 7,603,523 B2 * | 10/2009 | Blumrich et al. | ............. | 711/146 |
| 7,603,524 B2 * | 10/2009 | Blumrich et al. | ............. | 711/146 |
| 7,617,366 B2 * | 11/2009 | Blumrich et al. | ............. | 711/146 |
| 8,103,836 B2 * | 1/2012 | Blumrich et al. | ............. | 711/146 |
| 8,135,917 B2 * | 3/2012 | Blumrich et al. | ............. | 711/146 |
| 8,185,695 B2 * | 5/2012 | Conway et al. | ............... | 711/133 |
| 8,255,638 B2 * | 8/2012 | Blumrich et al. | ............. | 711/146 |
| 2004/0083343 A1 * | 4/2004 | Mithal et al. | ................. | 711/148 |
| 2004/0088492 A1 * | 5/2004 | Glasco | ......................... | 711/141 |
| 2004/0088493 A1 * | 5/2004 | Glasco | ......................... | 711/141 |
| 2004/0088494 A1 * | 5/2004 | Glasco et al. | ................. | 711/141 |
| 2004/0088495 A1 * | 5/2004 | Glasco et al. | ................. | 711/141 |
| 2004/0088496 A1 * | 5/2004 | Glasco et al. | ................. | 711/141 |
| 2004/0236912 A1 * | 11/2004 | Glasco | ......................... | 711/141 |
| 2004/0268052 A1 * | 12/2004 | Glasco | ......................... | 711/141 |

(Continued)

*Primary Examiner* — Kevin Verbrugge (74) *Attorney, Agent, or Firm* — Sterne, Kessler, Goldstein & Fox, P.L.L.C.

(57) ABSTRACT

Disclosed herein are a processing unit and a multi-processing unit system that implement a cache-coherency method. Such a multi-processing unit system includes a main memory, a first processing unit, and a second processing unit. The first processing unit and the second processing unit are coupled to the main memory. The first processing unit includes a cache and logic. The cache is configured to store data from the main memory. The logic is configured to maintain an entry in a directory of the cache. The entry indicates whether either of the first processing unit and the second processing unit accesses a data object of a cache line for which the first processing unit is a home node.

20 Claims, 7 Drawing Sheets

U.S. PATENT DOCUMENTS

| | | | |
|---|---|---|---|
| 2005/0033924 A1* | 2/2005 | Glasco | 711/119 |
| 2005/0251626 A1* | 11/2005 | Glasco | 711/133 |
| 2006/0004967 A1* | 1/2006 | Mithal et al. | 711/152 |
| 2006/0224835 A1* | 10/2006 | Blumrich et al. | 711/146 |
| 2006/0224836 A1* | 10/2006 | Blumrich et al. | 711/146 |
| 2006/0224837 A1* | 10/2006 | Blumrich et al. | 711/146 |
| 2006/0224838 A1* | 10/2006 | Blumrich et al. | 711/146 |
| 2006/0224839 A1* | 10/2006 | Blumrich et al. | 711/146 |
| 2006/0224840 A1* | 10/2006 | Blumrich et al. | 711/146 |
| 2006/0230239 A1* | 10/2006 | Blumrich et al. | 711/146 |
| 2007/0055826 A1* | 3/2007 | Morton et al. | 711/141 |
| 2008/0133845 A1* | 6/2008 | Blumrich et al. | 711/146 |
| 2008/0155201 A1* | 6/2008 | Blumrich et al. | 711/146 |
| 2008/0209128 A1* | 8/2008 | Blumrich et al. | 711/128 |
| 2008/0222364 A1* | 9/2008 | Blumrich et al. | 711/146 |
| 2008/0244194 A1* | 10/2008 | Blumrich et al. | 711/146 |
| 2009/0006770 A1* | 1/2009 | Blumrich et al. | 711/146 |
| 2010/0332762 A1* | 12/2010 | Moga et al. | 711/129 |
| 2011/0078492 A1* | 3/2011 | Kumar et al. | 714/5.11 |
| 2011/0154000 A1* | 6/2011 | Fryman et al. | 712/228 |
| 2012/0311272 A1* | 12/2012 | Blumrich et al. | 711/146 |

* cited by examiner

REDUCING CACHE PROBE TRAFFIC RESULTING FROM FALSE DATA SHARING

BACKGROUND OF THE INVENTION

1. Field of the Invention

The present invention is generally directed to computing operations performed in multi-processor computer systems. More particularly, the present invention is directed to reducing processor cache-coherency probe traffic resulting from false sharing of data in multi-processor computer systems and applications thereof.

2. Background

A multiprocessor computing system includes a main memory and a plurality of processors. Each processor can read from and write to the main memory. In addition to the main memory, each processor includes a cache memory, or simply a cache. The cache of a processor can be accessed by that processor faster than that processor can access the main memory. Thus, each processor stores frequently accessed data in its cache.

Consequently, multiple processors in a multi-processor system can each hold a copy of data corresponding to a single location in the main memory. Because each processor can access its own cache faster than it can access the main memory, each processor has the potential to update its local copy of the data before the updated data is stored in the main memory. If one of the processors modifies its local copy of the data and the other processors do not receive those modifications, the local copy of the data in each of the other processors may be out-of-date.

Conventional processors in a multiprocessor system implement one or more cache-coherency protocols to signal changes to cached data shared by multiple processors. Example cache-coherency protocols include, for example, MOESI, MESI, MESIF, and others. The signals that are broadcasted are termed probes or snoops.

Unfortunately, the sharing of cached data between processors in a multiprocessor system can lead to false sharing. False sharing occurs when multiple processors each store a local copy of a cache line, but each processor accesses a different data object/memory block of the cache line.

For example, a first processor and a second processor may each store a local copy of a cache line that includes two data objects—a data object A and a data object B—wherein the first processor accesses only the data object A and the second processor accesses only the data object B. Conventionally, if the first processor modifies data object A of its local copy of the cache line, the first processor will send a probe to the second processor, causing the second processor to update its local copy of the cache line even though the second processor is not accessing data object A. The first and second processor in this example are involved in false sharing because, although they each store local copies of the same cache line, they are each accessing different data objects of the cache line. False sharing is inefficient and leads to performance overhead and is, therefore, undesirable.

Conventional solutions for dealing with false sharing are software-based solutions. One such software-based solution is to pad data to insure that data objects that are accessed by two different processors do not fall on the same cache line. For example, if the first processor accessed only data object A and the second processor accessed only data object B, then this conventional solution would be to pad the data so that data object A falls on one cache line and data object B falls on another cache line.

This type of conventional solution is problematic for several reasons. For example, padding the data increases the memory footprint, thereby affecting performance because worthless data (i.e., the padding data) must be moved on a systems data busses.

Given the foregoing, what is needed is an improved manner for dealing with false sharing in multiprocessor systems.

BRIEF SUMMARY OF EMBODIMENTS OF THE INVENTION

Embodiments of the present invention meet the above-described needs by providing improvements for reducing cache probe traffic resulting from false data sharing in multiprocessor systems and applications thereof.

For example, an embodiment of the present invention provides a processing unit for use in a multi-processing unit system. In this embodiment, the multi-processing unit system includes a main memory and another processing unit. The processing unit comprises a cache and logic. The cache is configured to store data from the main memory. The logic is configured to maintain an entry in a directory of the cache. The entry indicates whether either of the processing unit and the other processing unit accesses a data object of a cache line for which the processing unit is a home node.

Another embodiment of the present invention provides a system, including a main memory, a first processing unit, and a second processing unit. The first processing unit and the second processing unit are coupled to the main memory. The first processing unit includes a cache and logic. The cache is configured to store data from the main memory. The logic is configured to maintain an entry in a directory of the cache. The entry indicates whether either of the first processing unit and the second processing unit accesses a data object of a cache line for which the first processing unit is a home node.

A further embodiment of the present invention provides a method implemented in a computing system, wherein the computing system includes a first processing unit, a second processing unit, and a main memory. According to this embodiment, the method includes storing data from the main memory in a cache line, wherein the cache line comprises one or more data objects. The method further includes maintaining an entry in a cache of the first processing unit, wherein the entry indicates whether either of the first processing unit and the second processing unit accesses a data object of the cache line.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding objects throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

Embodiments of the present invention are directed to reducing cache probe traffic resulting from false data sharing and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention are directed to filtering broadcast probes used to maintain cache coherency on multiprocessor/multi-node systems. According to an embodiment of the present invention, probe-filter (PF) logic uses a portion of a level-three (L3) cache to store a directory of entries that track cache lines. Each node maintains a separate directory and tracks lines cached anywhere in the multiprocessor/multi-node system for which it is the home node. Based on whether a cache line is present in the directory, the PF logic can either generate a directed probe or handle a data-access request without generating any probes.

Before describing additional details regarding PF logic in accordance with an embodiment of the present invention, it is first helpful to present an example system in which such PF logic may be implemented.

II. An Example System

Figure 1A:
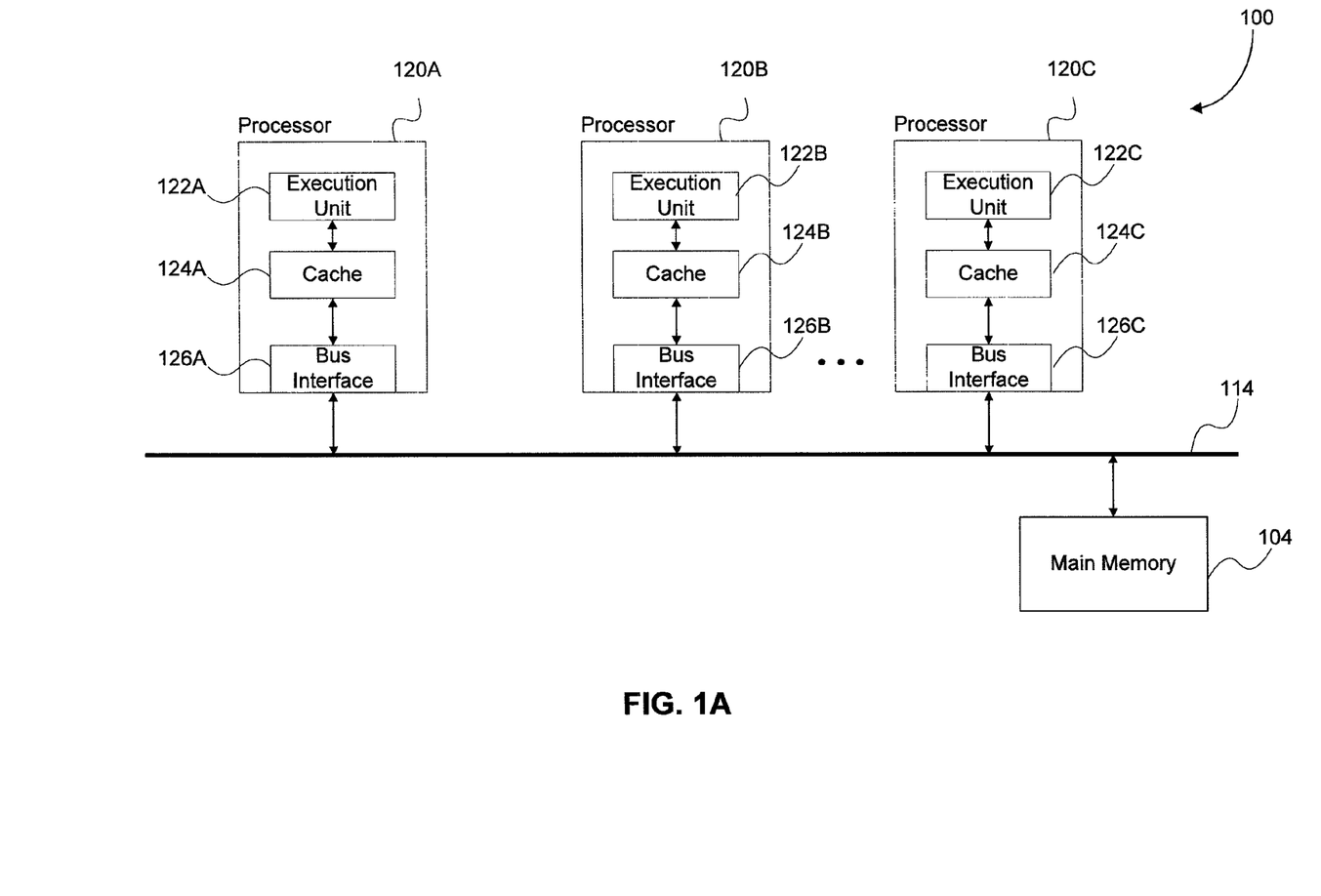
FIGS. 1A and 1B are block diagrams illustrating an example system that includes probe-filter logic in accordance with an embodiment of the present invention.
Figure 1B:
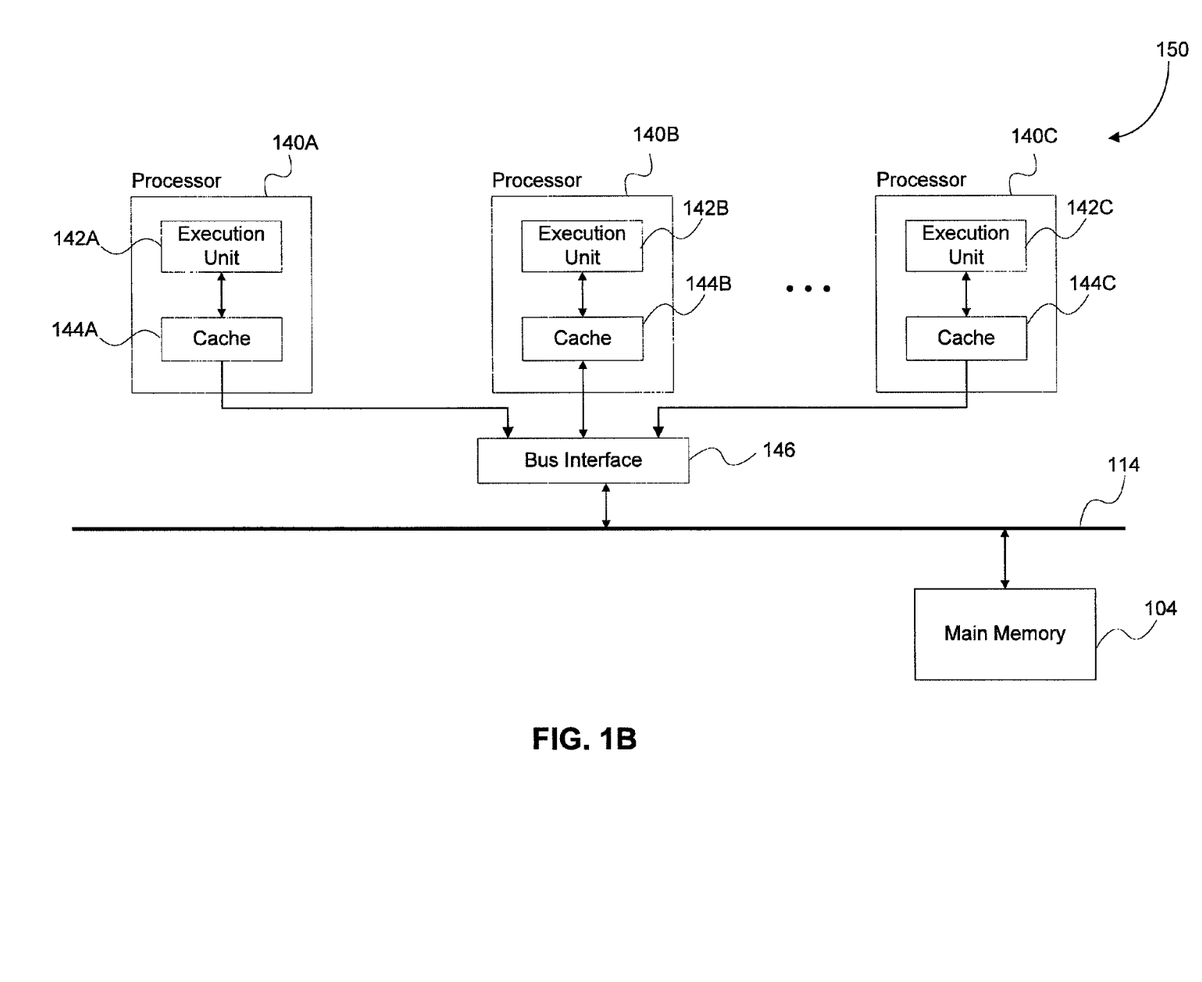

FIGS. 1A and 1B are block diagrams of example computing systems that include a plurality of processing units in accordance with an embodiment of the present invention. In embodiments, these computing system may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a plurality of processing units.

Although FIGS. 1A and 1B illustrate systems comprising three processing units, it is to be appreciated that this is for illustrative purposes only, and not limitation. In general, a multiprocessing unit system in accordance with an embodiment of the present invention may include two or more processing units.

Referring to FIG. 1A, computing system 100 includes a main memory 104 and a plurality of processing units—including a first processor 120A, a second processor 120B, and a third processor 120C. Processors 120 are each coupled to memory 104 via a bus 114. Bus 114 may be any type of communication infrastructure used in computer systems, including a peripheral component interface (PCI) bus, an accelerated graphics port (AGP) bus, a PCI Express (PCIE) bus, front-side bus (FSB), hypertransport (HT), or another type of communication structure or communications channel whether presently available or developed in the future.

As illustrated in FIG. 1A, processors 120A, B, C respectively include (i) execution units 122A, B, C; (ii) caches 124A, B, C; and (iii) bus interfaces 126A, B, C.

Execution unit 122 comprises one or more arithmetic logic units (ALUs) for executing instructions, as is well known in the art.

Figure 2:
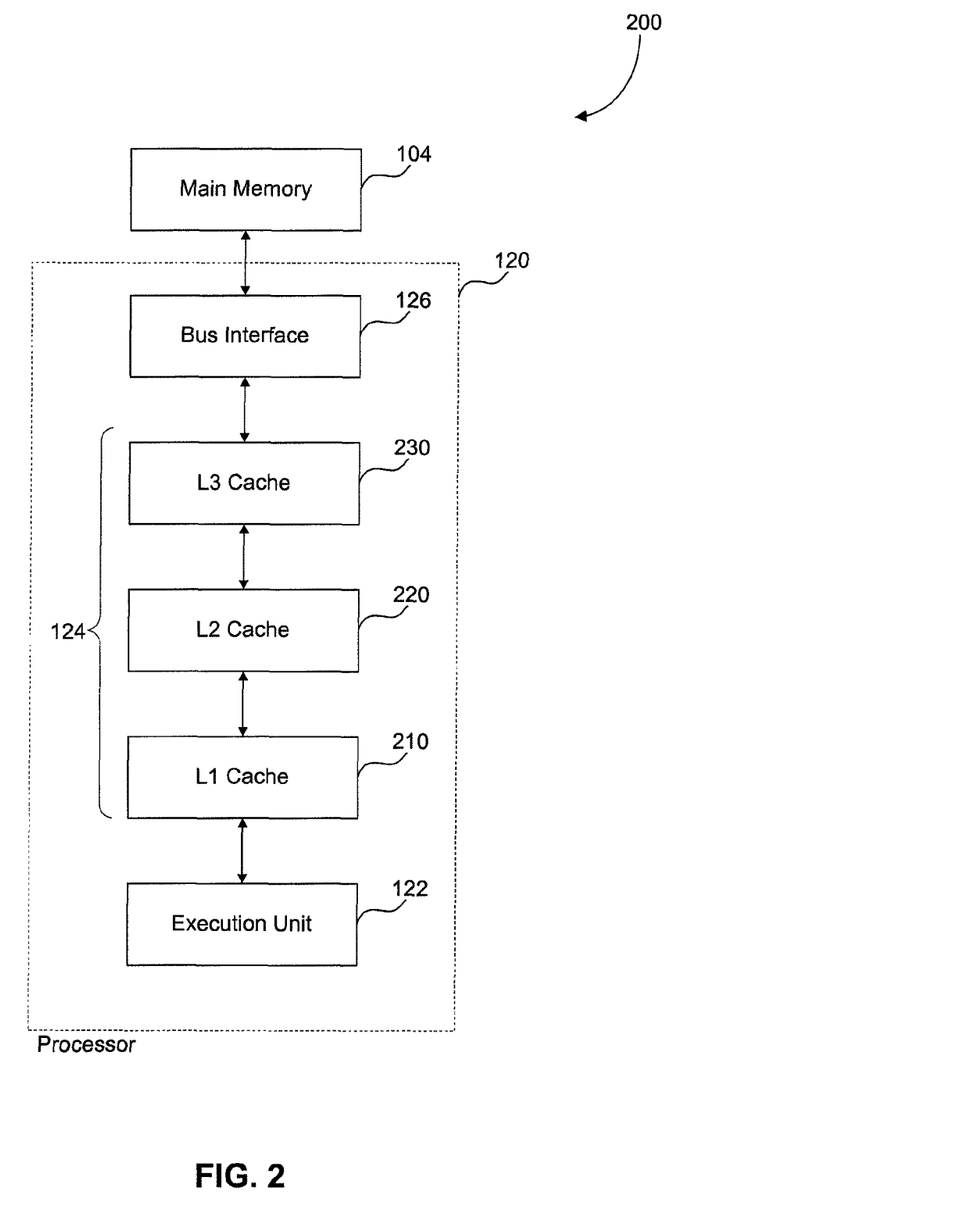
FIG. 2 is a block diagram illustrating additional details of a processor according to an embodiment of the present invention.

Each cache 124 is configured to store data and/or instructions. By storing the data and/or instructions in cache 124, processor 120 can access the data and/or instructions faster than if it had to retrieve the data and/or instructions from main memory 104. As illustrated in FIG. 2, cache 124 may comprise a multi-tiered cache, including a level-one (L1) cache 210, a level-two (L2) cache 220, and a level-three (L3) cache 230, as is well known in the art.

Bus interface 126 includes a memory controller for controlling access to main memory 104, as is known in the art. In addition, bus interface 126 includes PF logic for filtering probes in accordance with an embodiment of the present invention as described in more detail below.

In the embodiment of FIG. 1A, each processor 120 includes a bus interface 126 for controlling access to main memory 104 and for filtering probes in accordance with an embodiment of the present invention. In another embodiment, as illustrated in FIG. 1B, an example system 150 includes a single bus interface 146 for controlling access to main memory 104 by each of processors 140A, B, C. Like processors 120 of FIG. 1A, processors 140 of FIG. 1B each include execution units 142 and caches 144.

In the embodiment of FIG. 1A in which each processor 120 includes a bus interface 126, each bus interface 126 includes logic to track cache lines anywhere in the multiprocessor/multi-node system 100. In the embodiment of FIG. 1B in which there is a single bus interface 146 for system 150, bus interface 146 includes logic to track cache lines for each processor 140.

Figure 3:
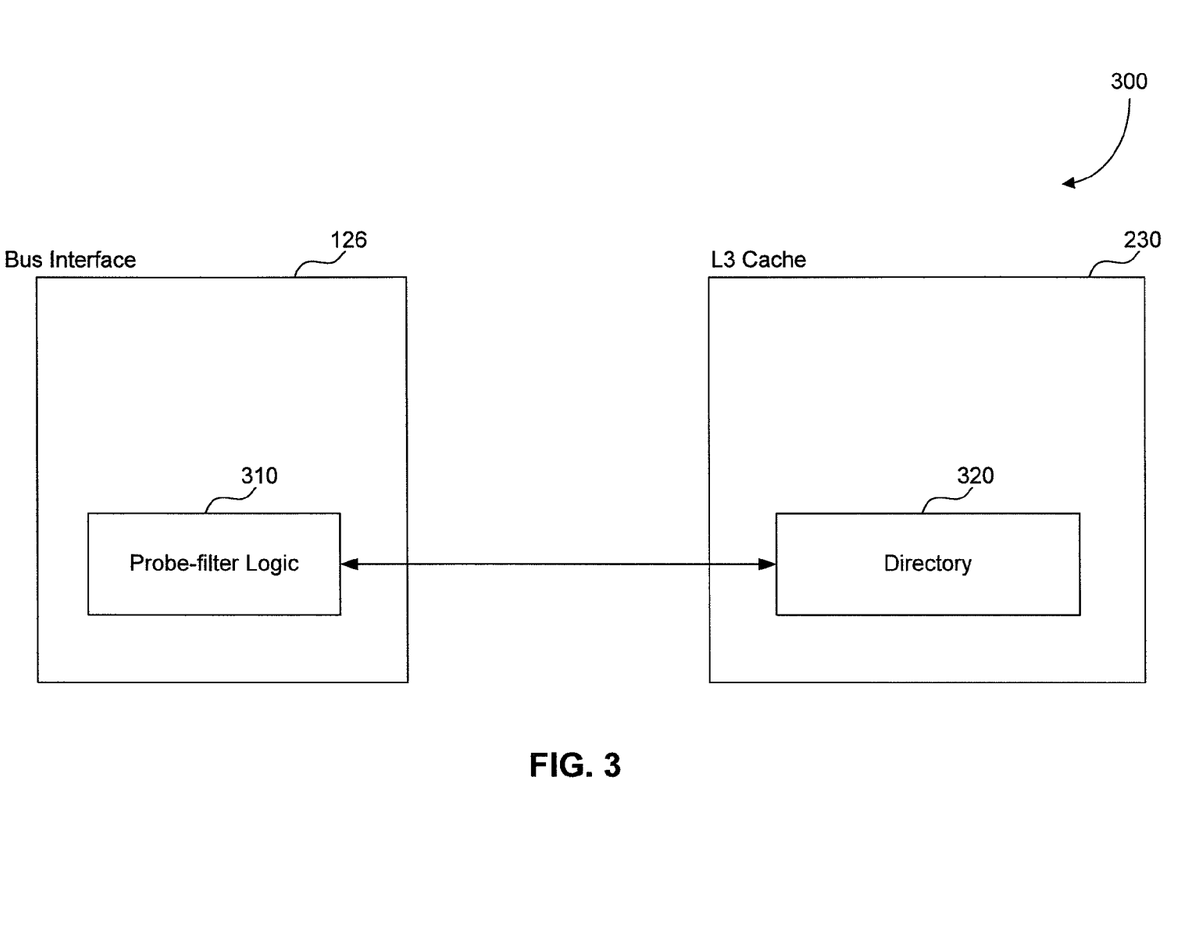
FIG. 3 is a block diagram illustrating interaction between probe-filter logic and a directory in accordance with an embodiment of the present invention.

FIG. 3 illustrates additional details of bus interface 126 in accordance with an embodiment of the present invention. Referring to FIG. 3, bus interface 126 includes probe-filter (PF) logic 310. PF logic 310 uses a portion of L3 cache 230 (e.g., 1 megabyte) to store a directory 320 of entries that track cache lines. Specifically, PF logic 310 of each particular processor 120 (node) maintains a separate directory 320 and tracks lines cached anywhere in the multiprocessor/multi-node system 100 for which that particular processor 120 is the home node.

Figure 4:
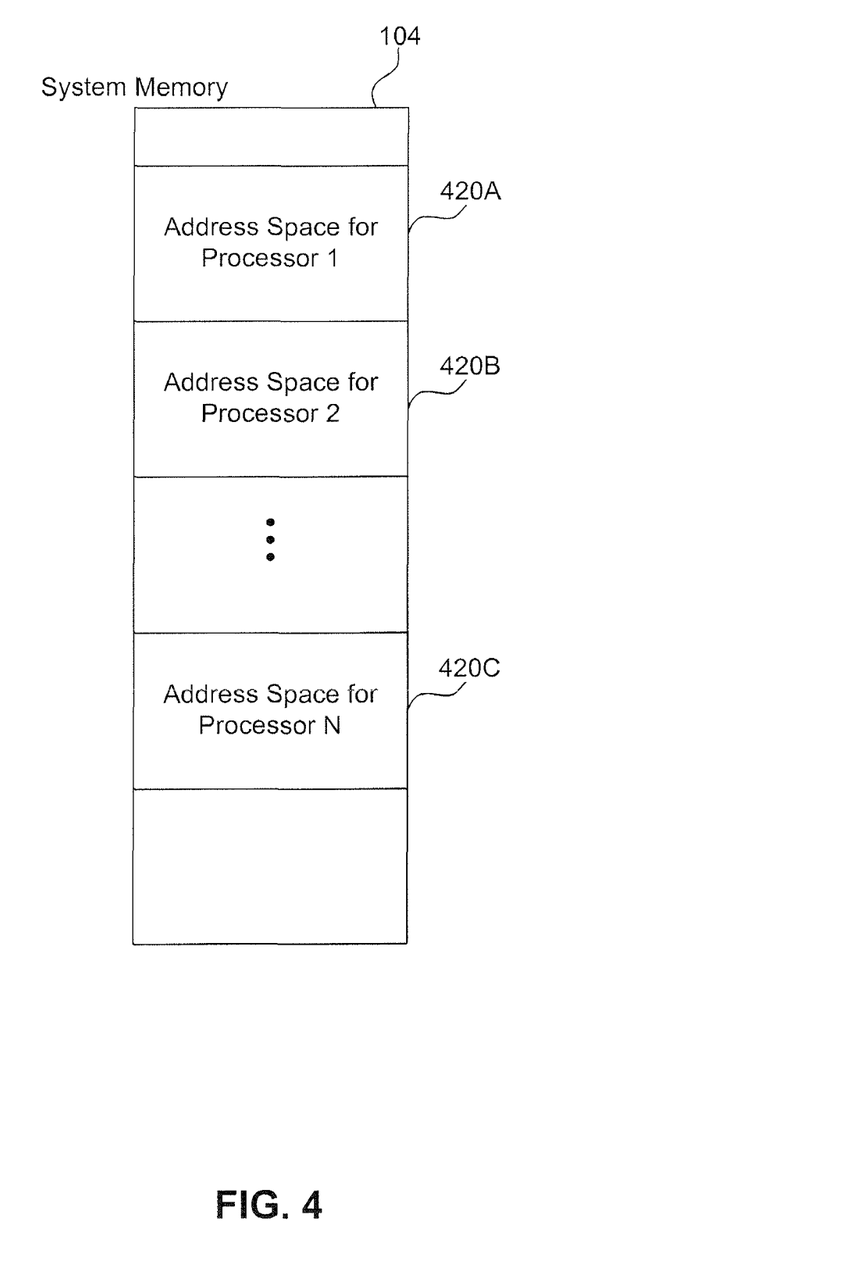
FIG. 4 is a block diagram illustrating example allocation of memory space to processing units of a system in accordance with an embodiment of the present invention.

A processor is the home node if a cache line originates from an address space in main memory 104 that is assigned to the processor. For example, FIG. 4 illustrates an example allocation of main memory 104. Referring to the example of FIG. 4, processor 120A is allocated an address space 420A, processor 120B is allocated an address space 420B, and processor 120C is allocated an address space 420C. Thus, for all cache lines originating from address space 420A, processor 120A is the home node; for all cache lines originating from address space 420B, processor 120B is the home node; and for all cache lines originating from address space 420C, processor 120C is the home node. According to the embodiment of FIG. 1A, if processors 120B and 120C each store in their respective caches 124B and 124C a cache line of data that originated from address space 420A, for example, then PF logic 310 of bus interface 126A maintains an entry in directory 320 to keep track of the cache line because processor 120A is the home node for that cache line.

Based on whether a cache line is present in the directory or not, PF logic 310 either generates a directed probe or handles the request without generating any probes. In an embodiment, each PF entry comprises a bit mask whose size depends on the number of processors/nodes in the system and the data-object/memory block granularity at which the system tracks false sharing.

For example, in an eight-processor system with 64-byte cache lines that tracks false sharing for every 16 bytes of data, the bit mask is 8 times 4 bits wide for each cache line. The "8" in this example bit mask corresponds to the eight processors in the system. The "4" in this example bit mask corresponds to the fact that there are four 16-byte chunks in a 64-byte cache line (since 64÷16=4). Each of the four 8-bit portions of the bit mask indicates whether a particular processor accesses (i.e., reads/writes) one of the four 16-byte chunks of the 64-byte cache line. A set bit indicates that the chunk is accessed, and an unset bit indicates that the chunk is never accessed (i.e., read or written) by a particular processor. However, it is to be appreciated that a set bit could indicate that a chunk is not accessed, and an unset bit indicates that a chunk is accessed, as would be understood by a person skilled in the art.

Example operation of such a bit mask is presented below.

III. Example Operation

For illustrative purposes, and not limitation, an example method for filtering probes in accordance with an embodiment of the present invention is described below in the context of an example two-processor system. In this example two-processor system, it is assumed for illustrative purposes that each cache line has two data objects—A and B—of 32-bytes and the two-processor system tracks false sharing at a granularity of 32-byte chunks. It is to be appreciated that the present invention is not limited to this example two-processor system nor any other two-processor system. Based on the description provided herein, a person skilled in the relevant art(s) will understand how to practice probe filtering in accordance with embodiments of the present invention in processor systems including more than two processors.

In this example two-processor system, a first processor, processor 1, and a second processor, processor 2, each hold a copy of the same cache line. For illustrative purposes, it is assumed that processor 1 is the home node for this cache line, and it is further assumed that processor 1 reads and writes both data object A and data object B of the cache line and that processor 2 reads and writes only data object B of the cache line. In this example, PF logic of processor 1 maintains a bit mask in the L3 cache of processor 1. The bit mask for this particular cache line can be represented as follows:

|0|1|, |1|1| wherein (i) bit 0 (on the extreme right) is set to indicate processor 1 accesses (reads/writes) data object B, (ii) bit 1 (second from the right) is set to indicate processor 2 accesses (reads/writes) data object B, (iii) bit 2 (second from the left) is set to indicate processor 1 accesses (reads/writes) data object A, and (iv) bit 3 (extreme left) is not set to indicate processor 2 does not access (read/write) data object A.

Figure 5:
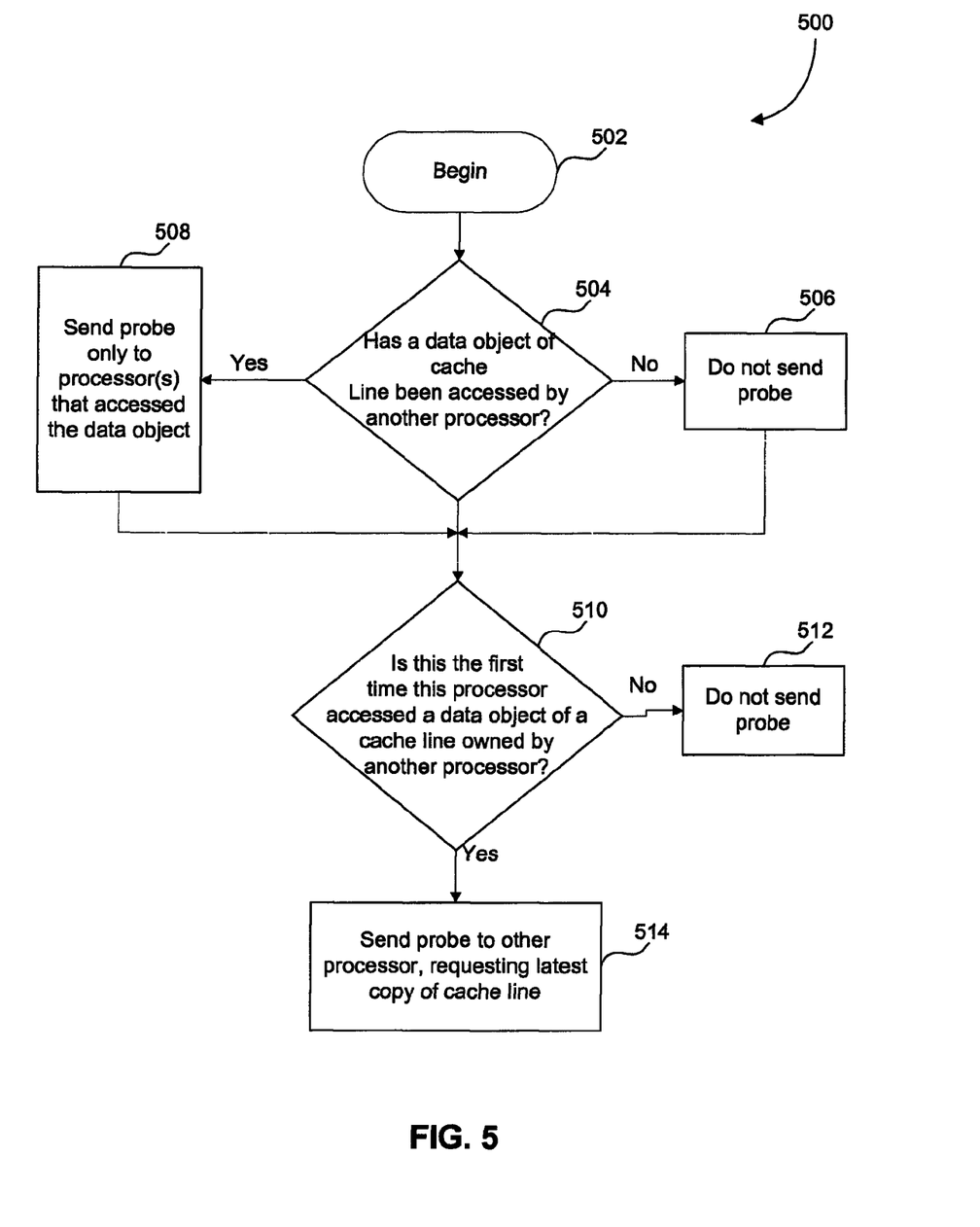
FIG. 5 is a flowchart illustrating an example method for reducing cache probe traffic resulting from false sharing in accordance with an embodiment of the present invention.

FIG. 5 illustrates an example method 500 for probe filtering to reduce cache probe traffic resulting from false data sharing that may be implemented by PF logic of processor 1 in accordance with an embodiment of the present invention. Method 500 begins at a step 502.

In a step 504, the PF logic of processor 1 determines whether another processor (e.g., processor 2) is accessing a data object of a cache line that is modified by processor 1 and for which processor 1 is the home node. This determination can be made based on the bit mask described above.

If in step 504, it is determined that no other processors access the data object of the cache line that was modified, then the PF logic of processor 1 is configured not to send any probes to the other processors as indicated in a step 506. For the example bit mask above, if processor 1 modifies object A of the cache line, the PF logic of processor 1 does NOT send a probe broadcast to processor 2 to indicate that the cache line is now dirty because processor 2 is NOT accessing object A.

If, on the other hand, it is determined in step 504 that another processor is accessing the data object of the cache line, then when processor 1 modifies the data object of the cache line the PF logic of processor 1 is configured to send a probe only to the processors that access that cache line as indicated in a step 508. For the example bit mask above, if processor 1 modifies object B of the cache line, the PF logic of processor 1 sends a probe broadcast to processor 2 to indicate that the cache line is now dirty because processor 2 IS accessing object B.

Thus, according to method 500, when a first processor modifies a data object of a cache line that is shared by another processor, the PF logic of the first processor sends a probe to the other processor only if the other processor is accessing the data object of that cache line. In contrast, conventional cache-coherency protocols require a first processor to send a probe whenever the first processor modifies a data object of a shared cache line even though the other processor(s) may not be accessing the data object modified by the first processor. Thus, by implementing the probe filtering of an embodiment of the present invention, the probe traffic between processors is reduced.

Returning to a step 510 of method 500 of FIG. 5, the PF logic keeps track of the first time that a processor accesses a data object of a cache line. For example, the PF logic of processor 1 keeps track of the first time that processor 1 accesses a data object of a cache line of data.

If in step 510, it is determined that this is NOT the first time that the processor is accessing the data object of the cache line, then the processor does not send a probe as indicated in a step 512.

If, on the other hand, it is determined in step 510 that this is the first time that the processor is accessing the data object of the cache line, then the processor sends a probe to the owner of that cache line, requesting the latest copy of that cache line, as indicated in a step 514. For example, suppose processor 1 reads a data object that was not previously accessed by processor 1. In this example, the PF logic of processor 1 tracks the first time a bit in non-zero bit-mask is set and requests the owner of the cache line to provide the latest copy.

IV. Example Computer Implementation

Figure 6:
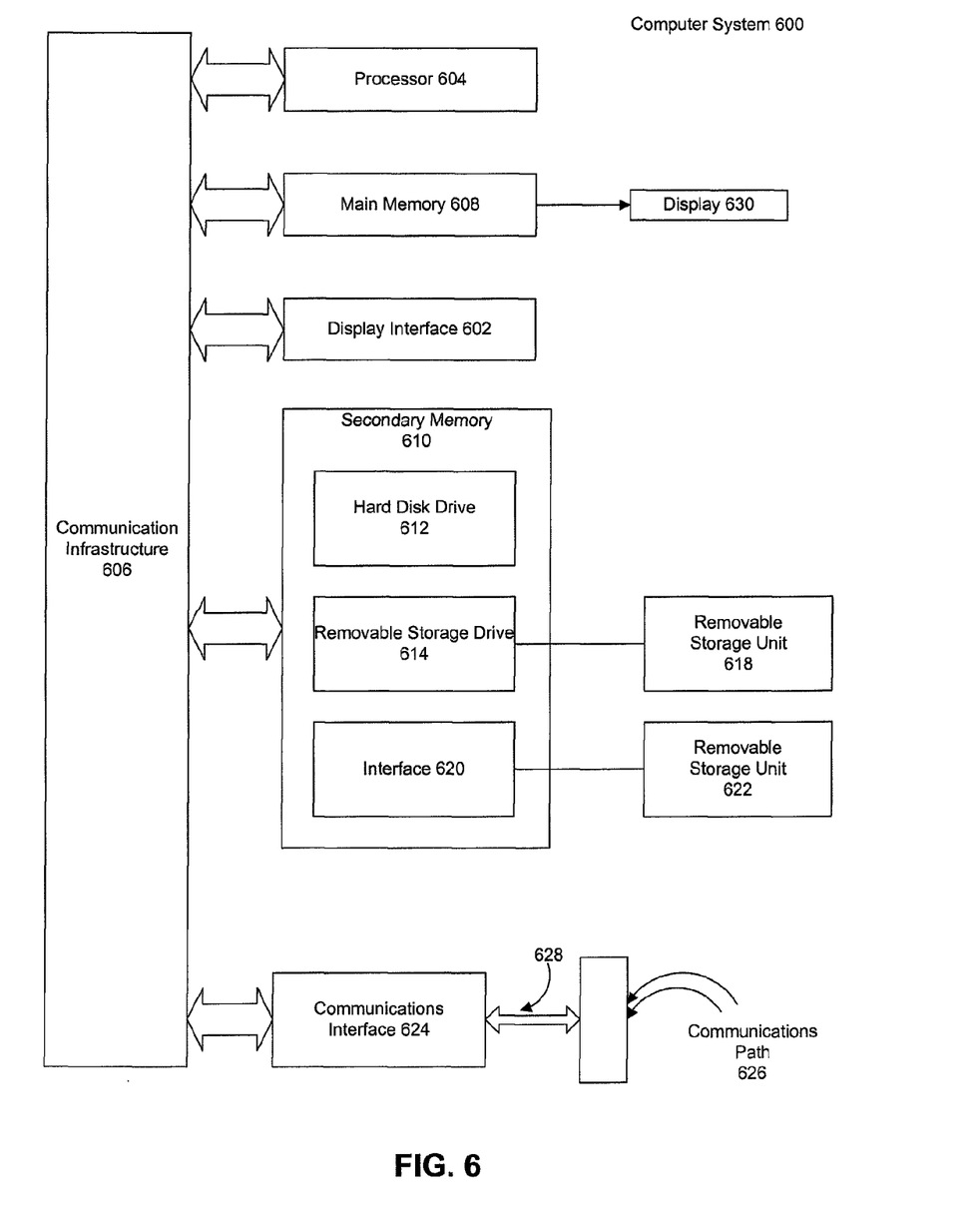
FIG. 6 illustrates an example computer system in accordance with an embodiment of the present invention.

Embodiments of the present invention may be implemented using hardware, software, or a combination thereof and may be implemented in one or more computer systems or other processing systems. Like computing system 100 of FIG. 1A and computing system 150 of FIG. 1B, FIG. 6 illustrates an example computing system 600 in accordance with an embodiment of the present invention. It is to be appreciated that computing systems 100, 150, and 600 are presented for illustrative purposes only, and not limitation. Although not specifically illustrated, it is to be understood that any component of any of computing system 100, computing system 150, and computing system 600 may be combined into a computing system as would be understood by those skilled in the art.

Like processors 120 of FIG. 1A and processors 140 of FIG. 1B, computer system 600 includes a plurality of processors, such as processor 604. Processor 604 may be a general-purpose processor (e.g., a central processing unit), a special-purpose processor (e.g., a graphics processing unit), or a combination thereof. Processor 604 is connected to a communication infrastructure 606 (e.g., a communications bus, cross-over bar, or network).

Computer system 600 includes a display interface 602 that forwards graphics, text, and other data from communication infrastructure 606 (or from a frame buffer not shown) for display on display unit 630.

Computer system 600 also includes a main memory 608 (like main memory 104 of FIG. 1), which is preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the faun of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, an radio frequency (RF) link and other communications channels.

In this document, the term "computer-readable storage medium" is used to generally refer to media such as removable storage drive 614 and a hard disk installed in hard disk drive 612. These computer program products provide software to computer system 600.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. Accordingly, such computer programs represent controllers of the computer system 600.

In an embodiment, the software may be stored in a computer program product and loaded into computer system 600 using removable storage drive 614, hard drive 612 or communications interface 624. The control logic (software), when executed by the processor 604, causes the processor 604 to perform the functions of embodiments of the invention as described herein.

V. Example Software Implementations

In addition to hardware implementations of processing units (e.g., processors 120, 140, and/or 604), such processing units may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as, method 500 illustrated in FIG. 5); (ii) the fabrication of the systems and techniques disclosed herein (such as, the fabrication of processing units 120, 140, and 604); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as, circuit-capture tools). The program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits.

VI. Conclusion

Disclosed above are embodiments for reducing cache probe traffic resulting from false data sharing and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A first processing unit comprising:
a cache configured to store data from a main memory; and
a circuit configured to maintain an entry in a directory of the cache, the entry indicating whether either of the first processing unit and a second processing unit accesses at least one data object of a cache line for which the first processing unit is a home node, wherein the home node indicates that the cache line of the first processing unit originates from an address space in the main memory, the address space being assigned to the first processing unit.

2. The first processing unit of claim 1, wherein the entry comprises a bit mask.

3. The first processing unit of claim 2, wherein the bit mask includes a first set of bits associated with the processing unit and a second set of bits associated with the second processing unit, each of the first and second set of bits including a bit associated with each of the at least one data object of the cache line.

4. The first processing unit of claim 1, wherein the cache line is stored in the cache of the first processing unit, and the circuit is operable to send a probe to the second processing unit when the entry indicates that the second processing unit accesses a data object of the at least one data object of the cache line for which the first processing unit is the home node.

5. The first processing unit of claim 1, wherein the circuit is operable to receive a probe from the second processing unit when the cache stores a cache line for which the second processing unit is a home node, wherein the home node indicates that the cache line of the second processing unit originates from an address space in the main memory, the address space being assigned to the second processing unit.

6. The first processing unit of claim 1, wherein a first time the first processing unit accesses at least one data object of a second cache line for which the second processing unit is a home node, wherein the home node indicates that the second cache line of the second processing unit originates from an address space in the main memory, the address space being assigned to the second processing unit, the circuit is configured to send a probe to the second processing unit requesting a latest copy of the second cache line.

7. The first processing unit of claim 1, wherein the circuit is configured to receive a probe from the second processing unit requesting a latest copy of the cache line for which the first processing unit is the home node, wherein the home node indicates that the cache line of the first processing unit originates from an address space in the main memory, the address space being assigned to the first processing unit, wherein the second processing unit accesses the cache line for a first time.

8. A method comprising:
   storing data from a main memory in a cache of a first processing unit; and
   maintaining an entry in a directory of the cache, the entry indicating whether either of the first processing unit and a second processing unit accesses at least one data object of a cache line for which the first processing unit is a home node, wherein the home node indicates that, the cache line of the first processing unit originates from an address space in the main memory, the address space being assigned to the first processing unit.

9. The method of claim 8, wherein the entry comprises a bit mask.

10. The method of claim 9, wherein the bit mask includes a first set of bits associated with the first processing unit and a second set of bits associated with the second processing unit, each of the first and second set of bits including a bit for each of the at least one data object of the cache line.

11. The method of claim 8, wherein the cache line is stored in the cache of the first processing unit, the method further comprising:
   sending a probe to the second processing unit when the entry indicates that the second processing unit accesses a data object of the at least one data object of the cache line for which the first processing unit is the home node.

12. The method of claim 8, further comprising:
   receiving a probe from the second processing unit when the cache stores a cache line for which the second processing unit is a home node, wherein the home node indicates that the cache line of the second processing unit originates from an address space in the main memory, the address space being assigned to the second processing unit.

13. The method of claim 8, further comprising:
   accessing for a first time, at least one data object of a second cache line for which the second processing unit is a home node, wherein the home node indicates that the second cache line of the second processing unit originates from an address space in the main memory, the address space being assigned to the second processing unit; and
   sending a probe to the second processing unit requesting a latest copy of the second cache line.

14. The method of claim 8, further comprising:
   receiving a probe from the second processing unit requesting a latest copy of the cache line for which the first processing unit is a home node, wherein the home node indicates that the cache line of the first processing unit originates from an address space in the main memory, the address space being assigned to the first processing unit, wherein the second processing unit accesses the cache line for a first time.

15. A non-transitory computer-readable storage medium containing instructions for execution by one or more processors to perform operations comprising:
   storing data from a main memory in a cache of a first processing unit; and
   maintaining an entry in a directory of the cache, the entry indicating whether either of the first processing unit and a second processing unit accesses at least one data object of a cache line for which the first processing unit is a home node, wherein the home node indicates that the cache line of the first processing unit originates from an address space in the main memory, the address space being assigned to the first processing unit.

16. The non-transitory computer-program product of claim 15, wherein the entry comprises a bit mask.

17. The non-transitory computer-program product of claim 16, wherein the bit mask includes a first set of bits associated with the first processing unit and a second set of bits associated with the second processing unit, each of the first and second set of bits including a bit associated with each of the at least one data object of the cache line.

18. The non-transitory computer-program product of claim 15, wherein the cache line is stored in the cache of the first processing unit, further comprising:
   sending a probe to the second processing unit when the entry indicates that the second processing unit accesses a data object of the at least one data object of the cache line for which the first processing unit is the home node.

19. The non-transitory computer-program product of claim 15, further comprising:
   receiving a probe from the second processing unit when the cache stores a cache line for which the second processing unit is a home node, wherein the home node indicates that the cache line of the second processing unit originates from an address space in the main memory, the address space being assigned to the second processing unit.

20. The non-transitory computer-program product of claim 15, further comprising:
   accessing for a first time, at least one data object of a second cache line for which the second processing unit is a home node, wherein the home node indicates that the second cache line of the second processing unit originates from an address space in the main memory, the address space being assigned to the second processing unit; and sending a probe to the second processing unit requesting a latest copy of the second cache line.

\* \* \* \* \*

UNITED STATES PATENT AND TRADEMARK OFFICE
CERTIFICATE OF CORRECTION

PATENT NO. : 8,447,934 B2  
APPLICATION NO. : 12/827719  
DATED : May 21, 2013  
INVENTOR(S) : Shrinivas B. Joshi Page 1 of 1

It is certified that error appears in the above-identified patent and that said Letters Patent is hereby corrected as shown below:

In the Claims

Column 9

Line 50, please replace "indicates that, the" with --indicates that the--.

Signed and Sealed this  
Twenty-fourth Day of June, 2014

Michelle K. Lee  
*Deputy Director of the United States Patent and Trademark Office*